United States Patent [19]

Wickert

[11] Patent Number: 4,800,107
[45] Date of Patent: Jan. 24, 1989

[54] DRY FOG SPRAYABLE LATEX PAINT

[75] Inventor: Frank A. Wickert, Olmsted Township, Hunterdon County, Ohio

[73] Assignee: The Glidden Company, Cleveland, Ohio

[21] Appl. No.: 108,766

[22] Filed: Oct. 15, 1987

[51] Int. Cl.$^4$ .............................................. B05D 1/02
[52] U.S. Cl. .................................... 427/421; 427/375
[58] Field of Search ............................... 427/421, 375

[56] References Cited

U.S. PATENT DOCUMENTS

| | | | |
|---|---|---|---|
| 3,925,580 | 12/1975 | Brewer | 427/421 |
| 4,069,186 | 1/1978 | Ramig | 524/497 |
| 4,242,384 | 12/1980 | Andrew et al. | 427/421 |
| 4,243,705 | 1/1981 | Yapp et al. | 427/421 X |
| 4,277,385 | 7/1981 | Carroll et al. | 523/221 |
| 4,283,320 | 8/1981 | Carroll et al. | 524/497 X |
| 4,335,163 | 6/1982 | Wong | 427/421 X |
| 4,547,410 | 10/1985 | Panush et al. | 427/421 X |
| 4,612,054 | 9/1986 | Hamon | 428/418 X |

Primary Examiner—Shrive Beck
Attorney, Agent, or Firm—Thomas M. Schmitz

[57] ABSTRACT

A sprayable pigmented latex paint exhibiting excellent dry fog overspray characteristics for spraying a paint film onto a substrate and hardening the paint at ambient temperatures. The PVC of the latex paint is between 60% and 80% and the volume solids of the paint is above 40%. At least 80% and typically between 85% and 100% of the dry fog overspray is easily removable by brushing or vacuuming. The latex paint is based on 20% to 40% film-forming binder, 30% to 40% non-film-forming polymeric particles, and 5% to 30% opacifying pigment on a dry solids volume basis.

3 Claims, No Drawings

DRY FOG SPRAYABLE LATEX PAINT

BACKGROUND OF THE INVENTION

This invention pertains to dry fog latex paints and particularly to sprayable latex paints applied by conventional or airless spray equipment where dry fog overspray settles as dust which can be easily cleaned up.

The term "dry fog" is often used to describe a spray applied coating where overspray dries to a tack free non-adherent dust or powder at a free fall distance of at least about eight feet to the clean-up surface. A dry fog coating quite often is used to coat ceiling and similar overhead substrates in commercial environments and especially in commercial or production facilities where dry fog overspray can be easily removed from the surroundings such as from floor or machinery by vacuuming or sweeping. A latex dry fog is a coating designed for high production spray application to ceilings of large commercial buildings. Dry fog requirements dictate that any overspray dry to a tack-free dust in a given free fall permitting quick and easy clean up. Latex paint systems are particularly desirable for such dry fog industrial coating applications although conventional prior art latex coatings do not exhibit satisfactory dry fog characteristics.

It now has been found that a highly desirable dry fog latex paint, preferably an eggshell enamel, can be produced utilizing plastic pigment or high Tg opaque polymer or similar non-film-forming polymer particle at the ambient room temperature of spray application to provide a highly desirable latex paint coating with highly advantageous dry fog overspray properties. In particular, it was advantageously found that solid, hollow or vesiculated plastic particles contained within the latex paint provides a unique latex dry fog paint which enables the latex paint to be applied by conventional or airless spray equipment. The spraying process incorporating the latex paint of this invention advantageously allows the overspray fog to settle as dry dust and permit easy clean up. In the case of an eggshell dry fog latex enamel, it was found that good "dry fog" properties are a function of high volume solids and high PVC. In a plastic pigmented paint system, increasing the PVC while maintaining gloss properties within the limitations specified for an eggshell enamel was achieved at 60–80% PVC. These paint systems also exhibited good adhesion properties and high hiding at reduced TiO$_2$ levels. Most importantly, their dry fog properties are significantly better than those of a conventionally pigmented latex eggshell enamel. These and other advantages of this invention will become more apparent by referring to the detailed description and illustrative examples.

Prior art patents based on plastic pigment include U.S. Pat. No. 4,069,186, U.S. Pat. No. 4,277,385 and U.S. Pat. No. 4,283,320.

SUMMARY OF THE INVENTION

Briefly, the invention pertains to a sprayable pigmented latex paint adapted to be spray applied to a substrate and harden at ambient temperatures where the latex paint particularly exhibits excellent dry fog overspray characteristics and between 85% and 100% by weight of the dry fog overspray is easily removed from areas surrounding the intended substrate by brushing or vacuuming. The dry fog overspray characteristics are obtained by a latex paint having a PVC between 60% and 80% PVC and volume paint solids above 40%, where the paint comprises on a dry volume solids basis:

between 20% and 40% film-forming polymeric binder between 30% and 40% non-film-forming polymeric particles and between 5% and 30% opacifying pigment

DETAILED DESCRIPTION OF THE INVENTION

The dry fog sprayable latex of this invention is primarily based on the inclusion in the latex paint of plastic pigment or opaque polymer or vesiculated plastic beads or similar non-film forming particles having an average particle size less than about two microns and preferably between 0.1 and 1 micron diameter. The pigment-volume-content (PVC) including the non-film-forming particles is quite important and in fact the efficiency of the dry fog characteristic appears to be a function of PVC where best dry fog properties are attained at high P.V.C.'s with attendant low binder content. In this regard, the P.V.C. should be bove about 60% PVC. Further paint characteristics that enable attainment of dry fog properties include volume solids of the latex paint above about 40% and the film-forming binder polymer portion of the paint solids comprising less than 40% of the paint solids by volume. Accordingly, the dry fog sprayable latex paint of this invention comprises between 30% and 70% by weight total solids where the dry solids comprise on a dry solids volume basis:

between 20% and 40% of a film-forming polymer binder;

between 30% and 40% non-film forming polymeric particles;

between 5% and 30% opacifying pigment having a refractive index above about 1.8;

between 0% and 25% inorganic non-opacifying pigment; and where the PVC of said latex paint is between 60% PVC and 80% PVC.

On the basis of non-film forming components alone and a dry solids volume basis, the non-film-forming components comprise:

between 50% and 95% non-film-forming polymeric particles between 5% and 50% opacifying pigment; and between 0% and 45% inorganic non-opacifying pigment.

The non-film forming polymer particles comprise copolymerized ethylenically unsaturated monomers and contain between 0.2% and 2% by weight copolymerized carboxylic monomers selected from acrylic and methacrylic acid. The non-film-forming polymeric particles can be solid, cellular, or vesiculated provided the plastic particles are non-film-forming under conditions of application whereby the particles remain as discrete particles in the paint film. The non-film-forming polymer particles has a glass transition temperature of at least about 50° C. and preferably about 25° C. higher than the ambient temperature that the paint film coalesces into a hardened dry paint film. Thus, paint films of this invention applied and formed at room temperatures of about 25° C. will contain non-film-forming polymer particles having a glass transition temperature (Tg) of at least about 50° C. and preferably at about 100° C. The glass transition temperature (Tg) for the solid non-film-forming polymer particles herein is measured when such polymer particles are in the aqueous latex emulsion paint mixture whereby the interacting effects of the various paint ingredients particularly coalescing solvents are taken into account. The Tg of non-film-forming polymeric particles can be estimated by Vicat softening point as determined by ASTM D-1525.

The non-film-forming polymer particles have a weighted average particle diameter above two microns and preferably between 0.1 and 1 microns in accordance with this invention so as to obtain increased film integrity properties and particularly to obtain dry fog properties. Average particle diameters can be measured in accordance with centrifugal separation by a disc centrifuge, Polymer Engineering and Science, 14 (5), May 1974, pp. 332–337. The non-film-forming polymer particles preferably are substantially spherical in geometric shape, and can have integral continuous surfaces or vesiculated or porous cellular surfaces. The non-film-forming polymer particles can be copolymerized ethylenically unsaturated monomers having a carbon-to-carbon ethylenic double bond unsaturation capable of addition polymerization through the ethylenic double bond and include, for example, styrene and substituted styrenes, vinyl chloride, vinylidene chloride, acrylonitrile, methacrylonitrile, esters of methacrylic acid and tertiary butyl acrylate, or copolymers thereof provided the non-film-polymer contains by weight 0.2% to 2% copolymerized carboxylic unsaturated monomers. The preferred particles are copolymers of styrene containing between about 0.2% to 2% by weight copolymerized carboxylic monomer selected from acrylic acid or methacrylic acid. The dry fog latex paints of this invention contain on a dry solids volume basis between about 30% and 40% plastic particles (non-film-forming polymer particles).

The dry fog latex paint of this invention further contains film-forming binder derived from copolymerized ethylenically unsaturated monomers. The binders contain latex dispersed polymer particles having a particle size preferably between about 0.1 to 1 micron. The film-forming binders can be vinyl copolymer binders containing at least 40% and preferably between about 80% to 100% of copolymerized vinyl unsaturated monomers containing vinyl double bond unsaturation including, for example, vinyl esters such as vinyl acetate, vinyl propionate, vinyl butyrates, vinyl benzoate, isopropenyl acetate and like vinyl esters; vinyl amides, such as acrylamide and methacrylamide; and vinyl halides such as vinyl chloride. Vinyl copolymer binders having polymer particles between about 0.1 to 0.3 microns are particularly preferred for imparting good gloss to the paint film. The vinyl polymers can be vinyl copolymers containing copolymerized ethylenically unsaturated monomers which can be copolymerized with said vinyl unsaturated monomers by free radical induced addition polymerization using peroxy or azo catalysts or the like. Ethylenically unsaturated monomers other than said vinyl unsaturated monomers can include, for example, those monomeric materials exhibiting ethylenic double bond unsaturation such as polymerizable allylic, acrylic, fumaric, maleic, or like ethylenically unsaturated double bond functionality (carbon-to-carbon unsaturation) which can be copolymerized with the vinyl double bond in said vinyl unsaturated monomers. Ethylenically unsaturated monomers other than vinyl unsaturated monomers can include, for example, styrene, methyl styrenes, and similar alkyl styrenes, chlorostyrene, vinyl toluene, vinyl naphthalene, divinyl benzene, diallyl phthalate and similar diallyl derivatives, butadiene, alkyl esters of acrylic and methacrylic acid and similar ethylenically unsaturated monomers.

Other suitable binders based on acrylic binders having a uniform average particle size unsaturated monomers including low alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amine acrylates and methacrylates. The ethylenically unsaturated monomers can be copolymerized by free radical induced addition polymerization using peroxy or azo catalysts, common redox catalysts, ultraviolet radiation, or the like. The particle size of the film-forming binder can be between 0.1 and 1 micron. The film-forming binder should constitute between about 20% to 40% based on the dry solids volume of the film to provide a PVC between about 60% and 80% PVC.

The binders have a glass transition temperature suitable for fusing and coalescing in a film under application or ambient temperature. Air drying paints at ordinary room temperature (25° C.) require a film-forming binder with polymer particles having a glass transition temoerature (Tg) of at least 5° C. and preferably at least 15° C. below the coalescing temperature to form a film or binding matrix at the ambient temperature. The glass transition temperatures of the film-forming binder of this invention is at least about 10° C. lower than the Tg of the non-film-forming polymeric particles. Preferably the differential between the film-forming polymer particles and non-film-forming polymer particles is about 30° C. The term "glass transition temperature" is a term well known in the art and generally defines a minimum softening temperature descriptive of long range translational motion of polymer molecules which results in plastic deformation or flow. A polymer particle having a glass transition temperature greater than room temperature will be a non-film-former at room temperature. The glass transition temperature can be measured in accordance with Journal of Paint Technology, 41 (53), pages 167–178 (1969). The glass transition temperature (Tg) for a film-forming polymer herein is measured when such polymer particle is in the aqueous latex emulsion paint mixture whereby the interacting effects of the various paint ingredients particularly coalescing solvents are taken in account. Alternatively, the Tg of the film-forming particles can be estimated by Vicat softening point as determined by ASTM Test D-1525.

The latex paint of this invention further contains a minor amount of opacifying pigments which generally have a refractive index of at least about 1.8. Typical white opacifying pigments include rutile and anatase titanium dioxides, titanox (titanium dioxide with iron impurities), lithopone, zinc sulfide, lead titanate, antimony oxide, zirconium oxide, titanium calcium, white lead, titanium barium, zinc oxide, leaded zinc oxide, mixture of the same, and like pigments. The preferred white inorganic opacifying pigment is rutile titanium dioxide having a weight average particle size between about 0.2 to 0.4 microns. Titanium yellow and like pigments having a high refractive index can be utilized as opacifying pigments as well as imparting tints to the paint. Although most opacifying pigments are white, all opacifying pigments having a high index of refraction above about 1.8 should be considered as an opacifying pigment for the purpose of this invention regardless of its tinting (tinctorial) effect on the resulting paint film. Opacifying pigments such as titanium dioxide comprise broadly between about 5% and 30% on a dry volume solids base of the latex paint.

The latex paint films are formed by coalescence of the film forming binder to form a binding matrix at the ambient paint application temperature to generate a hard, tack-free enanel film. Particularly desirable coalescing solvents are phenyl ether of diethylene glycol, diethylene glycol butyl ether, and dibutyl phthalate, diethylene glycol monobutyl ether acetate or monoethyl ether acetate, and 2,2,4-trimethyl-1,1,3, pentanediol monoisobutyrate. Coalescent is utilized at a level above 10 pounds and preferably at the level of about 15 pounds of coalescent per 100 gallons of latex paint. Preferably coalescent is added at the levels of 5%–15% based on polymer solids of the paint including both binder polymer and non-film-forming polymer.

The dry fog latex paint of this invention can contain tinctorial pigments which are pigmentary materials suitable for imparting a specific hue to the resulting latex emulsion paint. Tinctorial pigments generally include, for example, ferrite yellow oxide, ferric oxide, "brown" iron oxide (which is a blend of red, yellow, and black iron oxides), tan oxide of iron (which is a similar blend), raw sienna, raw and burnt umber, chromium oxide green, phthalocyanine green (chlorinated copper phthalonitrile), the green iron salt of nitroso beta naphthol, copper phthalonitrile blue, ultramarine blue, carbon black, toluidine red, parachlor red, paratone (red, alkali resistant red, BON red, and maroon), cadmium reds and yellows, Watchung red, madder lake (red), Duratone red, carmine red, chrome yellow (lead chromate), chrome organe, Hansa yellows and similar tinctorial pigments. Tinctorial pigments can comprise up to 25% on a dry solids volume basis and can be considered as part of the non-opacifying pigments.

The dry fog paint of this invention can contain non-opacifying filler or extender pigments having fairly low refractive indices and little or no opacifying properties to provide dry film re-enforcement, viscosity, and texture to the latex paint composition. Non-opacifying fillers and extenders often include clays, talc, wollastonite, barytes, calcium carbonate, silica, mica, and similar filler pigments, calcined clay, amorphous silica, and diatomaceous silica. Non-opacifying filler and extender pigments can comprise between about 0% and 25% of the latex paint on a dry solids volume basis.

The inventive latex emulsion paint can be made in a disperser mill such as a Cowles disperser. Preferably all the paint ingredients except the non-film-forming polymer particles and film-forming binder are first mixed together in the disperser mill, or alternatively, a sand mill, a pebble mill, a roller mill, or a ball mill. Then the non-film-forming polymer particles and film-forming binder are added to the resulting mixture and blended in, suitably with the high speed dispersing mixer or conventional tank stirrer. The resulting paint is an intimate dispersion.

Under preferred conditions, the dry fog overspray comprises a dry non-adhering powder where at least 85% and advantageously between 90% and 100% dry fog overspray can be easily removed by merely brushing or vacuuming the surfaces surrounding the substrate and collecting the dry overspray.

The following Examples illustrate the merits of this invention but should not be construed as limiting the scope of this invention.

EXAMPLE 1

|  | Weight Parts |
|---|---|
| Water | 13.90 |
| Potassium Tripolyphosphate | .11 |
| Min-u-gel 400 (Attapulgite Clay) | .93 |
| Byk 155 (Anionic Surf.) | .93 |
| Pluronic 10R5 (Non-ionic Surf.) | .23 |
| Dowicil (Bacteriacide) | .14 |
| Zopaque RCL-7 (TiO$_2$) | 9.27 |
| Burgess #10 (Clay) | 19.73 |
| Dapro DF880 (Defoamer) | .20 |
| Water | 3.63 |
| Disodium Phosphate | .37 |
| Texanol (Coalescing Aid) | .93 |
| Plastic Pigment 50% polystyrene latex | 24.00 |
| 76 Res 3078 (Vinyl copolymer acrylic) | 25.43 |
| Dapro DF 880 defoamer | .20 |
|  | 100.00 |

EXAMPLE 2

|  | Weight Parts |
|---|---|
| Water | 11.070 |
| Tanol 731 (Anionic Surf.) | .740 |
| Cosan 145 (Bacteriacide) | .150 |
| Drew Y381 (Defoamer) | .090 |
| Potassium Tripolyphosphate | .370 |
| Plastic Pigment (50% N.V.) | 9.230 |
| Zopaque RCL-7 (TiO$_2$) | 9.230 |
| Burgess #17 (Clay) | 20.760 |
| Plastic Pigment (50% N.V.) | 9.230 |
| Attagel 50 (Attapulgite Clay) | .920 |
| Plastic Pigment 50% polystyrene latex | 5.350 |
| Water | 5.276 |
| Texanol (Coalescing aid) | 1.380 |
| 76 Res 3078 Vinyl acrylic copolymer | 25.370 |
| Pluronic L62 (nonionic surf.) | .280 |
| AAP-95 (2 amino 1 propanol) | .180 |
| Drew Y381 (Defoamer) | .370 |
| Black Pigment Shading Base | .004 |
|  | 100.00 |

The foregoing description and examples are intended to illustrate the merits of this invention but are not intended to be limiting except by the appended claims.

I claim:

1. A method of dry fog spraying of pigmented latex paint to a substrate at ambient temperatures, comprising providing a pigmented latex paint having between about 30% and 70% by weight total solids, the latex paint comprising on a dry solids volume basis between 20% and 40% film-forming polymeric latex binder, between 30% and 40% non-film forming polymeric particles, between 5% and 30% opacifying pigment, and between 0% and 25% inorganic non-opacifying pigment, where the pigment-volume-content of the latex paint is between 60% and 80%, and the volume solids of the latex paint is above 40%;

dry fog spraying of said latex paint to a substrate at ambient temperatures and causing a dry fog overspray relative to the substrate the latex paint applied to the substrate adapted to coalesce into a hardened paint film at ambient temperatures, and where the dry fog overspray dries tack free as a free fall non-adherent dust or powder where 85% to 100% by weight of the dry fog overspray is easily removed from surface surrounding the painted substrate.

2. The method in claim 1 wherein the dry fog overspray is free falling and over 90% by weight of the dry fog overspray is removable.

3. The method in claim 1 wherein the dry fog overspray is removed by brushing or vacuuming.

* * * * *